Sept. 25, 1956        E. K. STODOLA        2,764,685
AUTOMATIC FREQUENCY CONTROL SYSTEM
Filed Oct. 24, 1950        4 Sheets-Sheet 1
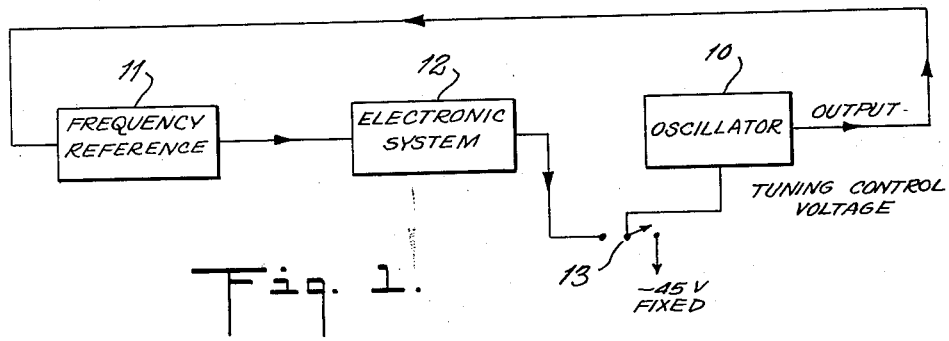
Fig. 1.
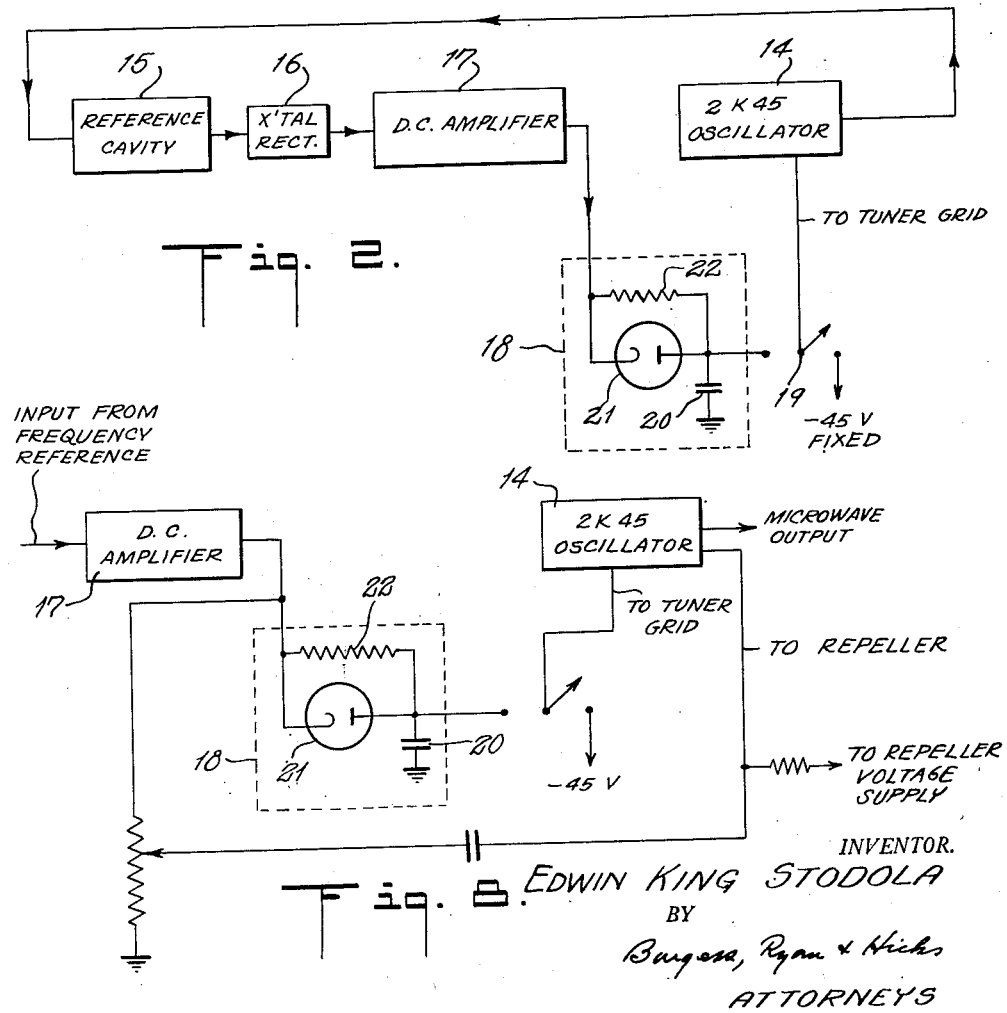
Fig. 2.
Fig. 3.
INVENTOR.
EDWIN KING STODOLA
BY
Burgess, Ryan & Hicks
ATTORNEYS

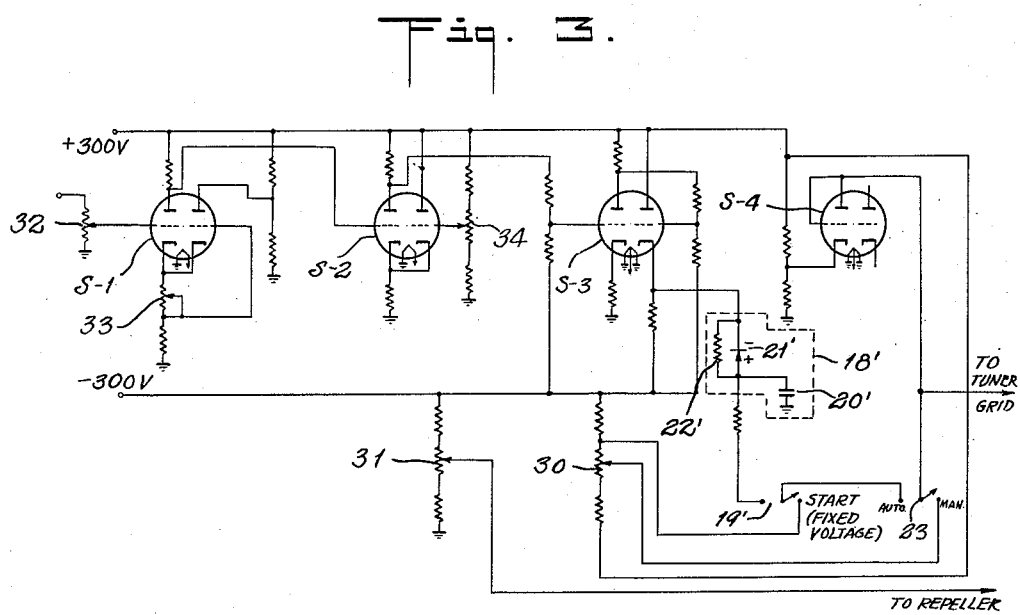
Fig. 3.
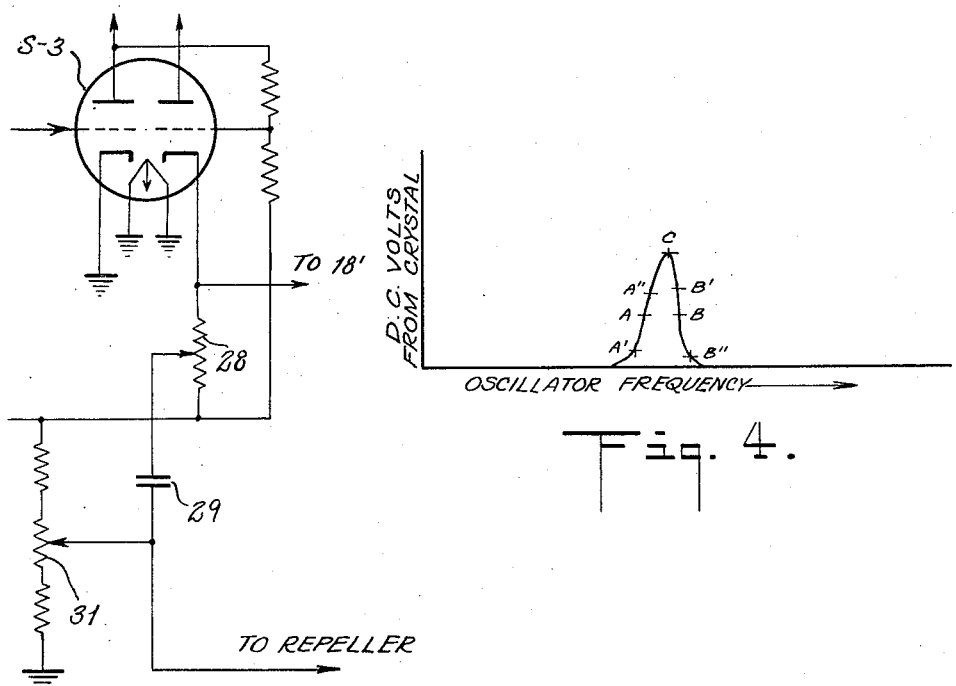
Fig. 4.
Fig. 5.
INVENTOR.
EDWIN KING STODOLA
BY
Burgess, Ryan & Hicks
ATTORNEYS Sept. 25, 1956　　　E. K. STODOLA　　　2,764,685
AUTOMATIC FREQUENCY CONTROL SYSTEM
Filed Oct. 24, 1950　　　　　　　　　　　　4 Sheets-Sheet 3

INVENTOR.
EDWIN KING STODOLA
BY
Burgess, Ryan & Hicks
ATTORNEYS

Sept. 25, 1956     E. K. STODOLA     2,764,685
AUTOMATIC FREQUENCY CONTROL SYSTEM
Filed Oct. 24, 1950     4 Sheets-Sheet 4

INVENTOR.
EDWIN KING STODOLA
BY
Burgess, Ryan & Hicks
ATTORNEYS

United States Patent Office 2,764,685
Patented Sept. 25, 1956

2,764,685

AUTOMATIC FREQUENCY CONTROL SYSTEM

Edwin King Stodola, Neptune, N. J., assignor to Reeves Instrument Corporation, New York, N. Y., a corporation of New York Application October 24, 1950, Serial No. 191,747

4 Claims. (Cl. 250—36)

This invention relates to an automatic frequency control system and relates more particularly to an automatic frequency control system for maintaining the frequency of a thermally tuned, reflex oscillator with respect to the frequency of a frequency reference.

An object of the present invention is to provide an automatic frequency control system by which the frequency of an oscillator such as a thermally tuned, reflex oscillator in micro-wave systems may be maintained within limits of one megacycle plus or minus with respect to the frequency of a resonant reference circuit. Another object of the invention is to provide means for automatically searching for a sensitive reference point and locking on such point after it has been found. Various other advantages and objects of the present invention will be best understood from the following description and the accompanying drawings in which:

Fig. 1 is a block diagram illustrating a basic automatic frequency control system embodying the present invention;

Fig. 2 is a block diagram illustrating an automatic frequency control system such as shown in Fig. 1, but including a lock-on memory element;

Fig. 3 is a schematic wiring diagram of an electronic system suitable for use in the system illustrated in Fig. 2;

Fig. 4 illustrates a typical frequency response curve for a reference cavity;

Fig. 5 illustrates the resulting wave forms from a detector in the cavity when frequency modulation is applied to the input of the cavity;

Fig. 8 is a block diagram illustrating a modification of the system illustrated in Fig. 2; and Fig. 9 is a schematic wiring diagram illustrating portions of the system shown in Fig. 8.

Figure 6:
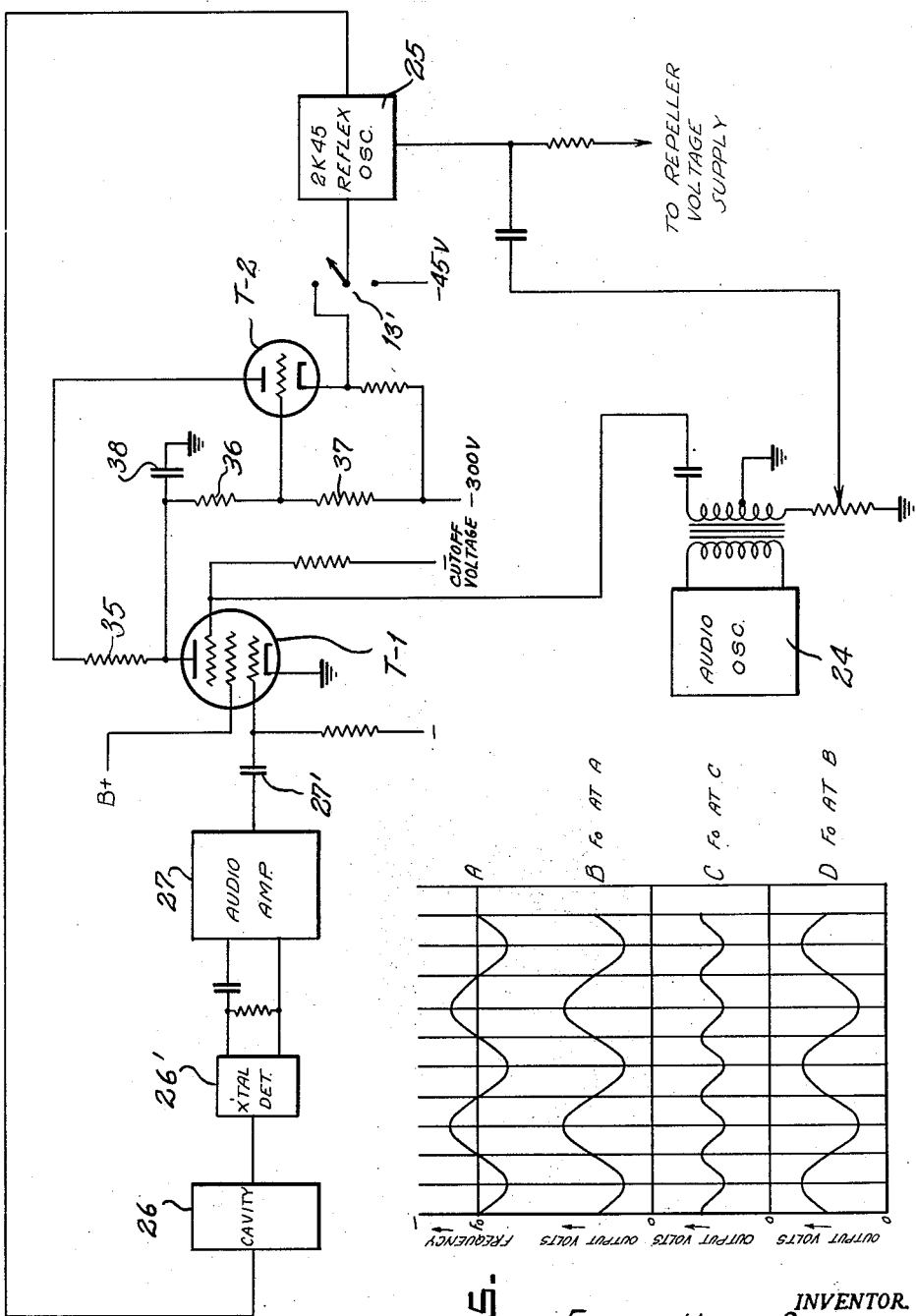
Fig. 6 is a block diagram illustrating a modification of the automatic frequency control system embodying the invention in which the output of the electronic system is frequency modulated.

In an automatic frequency control system embodying the invention, as illustrated in Fig. 1, the output of an oscillator 10 is connected to a frequency reference 11. The frequency reference 11 may be a cavity or other suitable frequency reference such as a discriminator which will deliver an output only when the frequency which is applied to it, such as from the oscillator, is in the immediate vicinity of the sensitive frequency of the reference. The output of the frequency reference 11 is connected to an electronic system 12 such as an amplifier which is designed to deliver a D. C. output having a quiescent voltage corresponding to one of the limits of the usable excursion of the voltage of a control element of the oscillator. When an output from the frequency reference is applied to the electronic system, it causes the output voltage of the electronic system to move toward or even beyond the other limit of the usable excursion of the voltage of the oscillator control element. If desired, a limiter may be employed to prevent the output voltage of the electronic system from going beyond the limit of the usable excursion of the voltage of the control element. Under such circumstances, the output voltage of the electronic system 12 will depend upon the degree to which the electronic system is energized by the output of the frequency reference 11.

The tuner control grid of the oscillator 10 is connected by a switch 13 to either a fixed voltage or to the output of the electronic system 12. The value of such fixed voltage will correspond to the limit of the usable excursion of the voltage of the control element opposite to the quiescent output voltage of the electronic system.

In the particular embodiment illustrated in Fig. 1, the source of fixed voltage to which the oscillator is connected by the switch 13 has a value of minus 45 volts and the output of the electronic system has a quiescent voltage of plus 15 volts which is moved toward or beyond minus 45 volts upon energization of the electronic system. In operation of the system, the switch 13 is first set to connect the tuner control grid of the oscillator 10 to the source of fixed voltage (minus 45 volts) and is allowed to remain at this position for at least 10 seconds which permits the oscillator 10 to drift to the high frequency limit of its tuning range. The switch 13 is then thrown so as to connect the output of the electronic system 12 (which is normally at plus 15 volts) to the tuner or control grid of the oscillator 10. Due to the change in voltage on the tuner grid, the frequency of the oscillator then starts to drift down from its high frequency limit and as it passes through the frequency to which the frequency reference 11 is sensitive, an output from the frequency reference is applied to the electronic system 12 and the output voltage of the electronic system drops towards minus 45 volts. The decrease in the output voltage of the electronic system 12 tends to cause the frequency of the oscillator 10 to drift back towards its high limit. The drift of the oscillator 10 will stop at the frequency where the tendency of the electronic system 12 to rest at plus 15 volts is just balanced by the output from the frequency reference 11 which tends to drive the output voltage of the electronic system 12 toward minus 45 volts. By employing an electronic system 12 in which the gain is high and a frequency reference 11 which is very sharply tuned, the output frequency of the oscillator 10 may be maintained within very close limits with respect to the sensitive frequency of the frequency reference.

Referring now to Fig. 2, a system is shown for applying the system illustrated in Fig. 1 to a thermally tuned, reflex oscillator 14. In a thermally tuned, reflex oscillator of the type known commercially as a "2K45" oscillator, there is a resonant cavity, the frequency response of which may be tuned or adjusted by a bimetallic element which forms the plate of a tuner triode in the oscillator. The power dissipated on and therefore the temperature of the bimetallic element is controlled by the grid potential of the tuner triode. Because the heating power of the triode plate current is dissipated directly in the bimetallic element, the direction of mechanical movement of the bimetallic element in response thereto can be reversed very rapidly.

An oscillator of the "2K45" type may be tuned through a frequency range from 8500 to 9660 megacycles and this frequency range corresponds to a D. C. voltage range on the grid of the tuner triode element of the oscillator of from about minus 4 to plus 15 volts when a 750 ohm unbypassed resistor is included in the cathode circuit of the oscillator. However, to provide large changes in the power dissipated on the bimetallic element of the tuner triode so as to produce rapid changes in the frequency of the oscillator, the voltage applied to tuner grid may be swung between minus 45 and plus 15 volts. If the voltage of the tuner grid is maintained at minus 45 volts (or at a more negative voltage if convenient since cut off occurs at about minus 35 volts) for an extended period and then is suddenly shifted to plus 15 volts, the frequency of the oscillator cavity will drift through its range from 9660 mc. to 8500 mc. in about nine seconds. If the tuner grid voltage is then returned to minus 45 volts, the frequency of the oscillator cavity will then drift back to its high limit. It should be mentioned that the oscillations do not necessarily occur over the entire range of frequency unless means are provided to vary the repeller voltage of the oscillator as required, and ordinarily the repeller voltage is set to permit oscillations only in the region desired.

In applying the basic system to the thermally tuned reflex oscillator 14, the output of the oscillator is connected through a wave guide reference cavity 15 and a crystal rectifier 16 to a D. C. amplifier 17. In addition, the output of the D. C. amplifier 17 is connected through a lock-on memory element 18 and a switch 19 to the tuner grid of the oscillator.

The function of the lock-on memory element 18 is to provide sufficient time to allow the oscillator to reverse its direction of drift. It was found that when the frequency of the oscillator was allowed to drift past the frequency response range of a reference cavity having a narrow frequency range to which it is sensitive, the period during which the D. C. amplifier 17 produced output might be too short to allow the oscillator 14 to reverse its direction of drift. The lock-on memory element 18, illustrated in Fig. 2, includes a condenser 20 that is rapidly charged through a diode 21 and this charge persists for a slightly extended period depending upon the value of a resistance 22 that is connected across the diode. The duration of the period during which this charge persists may thus be fixed to provide sufficient time to insure that the oscillator 14 will reverse its direction of frequency drift and for the frequency of the oscillator to drift back to the sensitive frequency of the reference cavity 15. By employing such an arrangement it is possible to obtain reliable locking of the frequency of the oscillator with little difficulty. It should be noted that in this arrangement, the output impedance of the D. C. amplifier 17 should preferably be relatively low so as to permit rapid charging of the condenser 20.

In a D. C. system such as illustrated in Fig. 2, the use of the wave guide cavity 15 as the frequency reference in the manner shown may result in the oscillator frequency being held at a value somewhat displaced from the center frequency of the frequency range of the reference cavity, and this displacement differs with the frequency, depending upon the output of the oscillator and the degree of coupling. Such displacement occurs because the frequency drift of the oscillator ceases at a frequency which will produce just enough output from the cavity 15 and the crystal 16 to balance exactly the tendency of the output of the D. C. amplifier 17 to return to its quiescent position (plus 15 volts) and this frequency is usually well down the slope of frequency response curve of the cavity—in fact this condition is necessary if good frequency control is to be achieved. Thus, in the system described above, displacements of about 1½ megacycles/sec. may occur under favorable operating conditions. Such displacements may, if desired, be overcome by the use of a microwave discriminator, but this adds some complications to the micro-wave system.

It should also be noted that a D. C. amplifier having a gain of about 2,000 is desirable. However, the design of a D. C. amplifier of high gain which does not require at least occasional rebalancing is difficult and further, due to inherent microphonic effects in such amplifiers, the subjecting of the amplifier to mechanical shocks may cause sudden shifts in the quiescent point of the output of the amplifier. If the change in the quiescent output of the amplifier becomes too great either because of shock or drift, the system may become inoperative. These difficulties may be overcome to some extent by using a carrier type amplifier in which the D. C. output of the crystal 16 is modulated and the modulated wave is amplified by an A. C. amplifier and then is rectified to produce a larger D. C. output. However, it should be noted that such modulation should be done at a fairly high frequency to insure obtaining at least one complete cycle as the frequency of the oscillator drifts through the frequency response curve of the cavity 15.

Fig. 3 illustrates an electronic system including a D. C. amplifier suitable for use in the system previously described. The D. C. amplifier consists of three dual triodes S–1, S–2 and S–3. In the first two stages S–1 and S–2 of this amplifier, industrial tubes known commercially as "5691" type tubes are used because of their ability to withstand mechanical shock. Each of the first two stages is connected in compensating type circuits which reduce drift to a point where stable operation over long periods is possible. The third stage S–3 is a 12AU7 tube and one half of this stage is utilized as a cathode follower to provide isolation and a relatively low output impedance. In this circuit, a crystal 21' known commercially as a "1N38" crystal has a one megohm shunting resistor 22' connected across it and a 0.001 mfd. condenser 20' connected to its output to serve as a lock-on memory device or element 18'. Actually, the effective resistance across the crystal is considerably less than one megohm because of the internal back resistance of the crystal.

A fourth stage S–4 which functions as a diode which is known commercially as a "12AT7" tube, prevents the voltage applied to the tuner grid of the oscillator from exceeding plus 15 volts during its adjustment or because of drift of the amplifier. A manually operable potentiometer 30 is provided in a circuit connecting the tuner grid of the oscillator to a source of voltage for initial adjustment of the system and a potentiometer 31 is also provided in a circuit connecting the repeller grid to the source of voltage for manually setting the voltage applied to the repeller of the 2K45 oscillator to the required voltage.

A switch 23 connects the tuner grid of the oscillator to the output of the amplifier or to the variable element of the potentiometer 30. In initiating the operation of this system, the switch 23 is first set to connect the tuner control grid of the oscillator to the potentiometer 30 and the input gain of the amplifier is then set to zero gain by adjusting a variable resistor 32 which is connected between the output of the crystal in the wave guide (or a discriminator) and the input of the first stage S–1 of the amplifier. The crystal in this case must be connected so that a positive output is obtained. A resistor 33 in a compensating network for the first stage S–1 of the amplifier is then adjusted to a point at which a minimum voltage is observed between the cathode of the first stage S–1 and ground. A variable resistor 34 in a balancing network for the second stage S–2 is then set so that an output voltage of about plus 15 volts is obtained from the cathode of the output cathode follower stage S–3 to ground. The input gain control resistor 32 is now set to maximum gain and the switch 23 is set to connect the tuner control grid to the switch 19'. When the repeller voltage control potentiometer 31 is set to the proper voltage for operation of the oscillator at the frequency of the reference cavity, the system may be locked on frequency by setting the switch 19' to connect the tuner control grid to a fixed voltage for about ten seconds and then switching the connection of the tuner grid to the output of the electronic system as previously described. After a few seconds, not more than ten seconds, the system will lock on frequency which will be evidenced by the tuner grid voltage assuming a value somewhere between minus 4 and minus 20 volts D. C. rather than the quiescent value of plus 15 volts.

Operation of the electronic system may be checked by setting the switch 23 to its manual position and setting the tuner grid voltage at a fixed value (by adjusting the manual tuning potentiometer 30) to give the desired frequency response of the oscillator. Then, as the cavity 15 is tuned through the frequency at which the oscillator is operating, the voltage at the cathode of the output cathode follower stage S–3 should drop from plus 15 volts to a negative value considerably in excess of minus 45 volts. This procedure also permits a definite setting of the repeller voltage to the proper value.

The system illustrated in Fig. 6 represents a modification of the previously described systems in which frequency modulation of the reflex oscillator, or alternatively, of the resonant frequency of the reference cavity is employed. The system illustrated in Fig. 6 locks at the center frequency of the reference cavity, is quite free of drift and can withstand violent shocks.

Before considering this system, reference is made to the typical frequency response curve of the reference cavity and crystal illustrated in Fig. 4. As the oscillator frequency is varied, the output of the crystal will vary in the manner shown by the curve of Fig. 4. Referring now to Fig. 5, if the oscillator frequency is cyclically varied through a small range about point A, for example, and between the limits A' and A'', the modulated output voltage of the crystal will vary in a similar cyclical manner as shown by the curve A of Fig. 5 which is shown in its phase relation to the phase of the frequency modulation as indicated by the curve B. It will be seen that as the center frequency of the frequency modulation passes from one side of the cavity resonance frequency to the other, the phase of the modulation of the crystal output reverses as indicated by the curve D. By applying a phase detector system to the modulated crystal output, a response will be obtained as the frequency of the crystal output passes into the region characterized by the curve C in Fig. 5.

As previously mentioned, an analogous effect may be obtained by causing the resonant frequency of the cavity instead of the oscillator to be cyclically varied through similar limits. This would produce an A. C. output whose phase would be a function of the frequency at which the oscillator is operating without the necessity for modulation of the oscillator frequency. This would be advantageous where direct modulation of the frequency of the oscillator is not desired.

The circuit illustrated in Fig. 6 utilizes this principle in automatic control of the oscillator frequency. In this circuit, a pentode T–1 has D. C. biases applied to both the control and suppressor grids that are sufficient independently to cut off the plate current. An A. C. voltage from an audio oscillator 24 is connected to and excites the suppressor grid of the pentode T–1 and is also connected to the repeller of a thermally tuned, reflex oscillator 25 of the "2K45" type. The audio oscillator thus provides for frequency modulation of the oscillator 25 by adding a small A. C. component to the repeller voltage of the oscillator. The output of the oscillator 25 is connected through a reference cavity 26, a crystal 26', an audio amplifier 27 and a condenser 27' to the control grid of the pentode T–1.

In the absence of any signal from the reference cavity 26 and the audio amplifier 27, the plate of the pentode T–1 is non-conducting despite the A. C. voltage applied to its suppressor grid from the audio oscillator 24. However, when the frequency of the oscillator 25 approaches the sensitive frequency of the reference cavity 26, a signal is delivered to the control grid of the pentode T–1 by the audio amplifier 27, but as long as the output voltage of the amplifier is out of phase with the voltage applied to the suppressor grid of the pentode T–1, the plate of the pentode remains non-conducting if the system is so phased that the frequency from the side in which the voltage generated in the audio amplifier is out of phase with the voltage on the suppressor grid of the pentode T–1. As soon as the frequency of the oscillator 25 approaches the center frequency of the reference cavity 26, the wave form C of Fig. 5 is obtained which produces a positive voltage component on the control grid of the pentode T–1 that is in phase with the voltage on the suppressor grid and the plate of the pentode then becomes conducting. This causes a sudden drop in the plate voltage of the pentode T–1 which in turn causes a corresponding drop in the tuner grid voltage of the oscillator 25 to which the plate of the pentode T–1 is coupled by means of resistors 35, 36 and 37, a cathode follower triode T–2 and a switch 13'. By proportioning the resistors 35, 36 and 37 so that the cathode of the cathode follower triode T–2 is at plus 15 volts in the absence of a signal, the frequency of the oscillator 25 will tend to drift back, and the system will come to a balanced condition when a signal is produced by the amplifier 27 as in the D. C. system previously described. With proper phasing of the audio oscillator voltages, the system will lock at a frequency very near the center frequency of the reference cavity.

In this system, the resistors 35, 36 and 37 and a condenser 38 which is connected to the plate of the pentode T–1 function as the lock-on memory device previously described. By making the capacity of the condenser 38 small, the voltage at the plate of the pentode T–1 can be made to drop very rapidly when the plate circuit starts to conduct and thus, cause a rapid reversal of the tuner grid potential. However, if the value of the resistors 35, 36 and 37 is large, the recovery time constant will be sufficiently long to provide the delay necessary to assure reversal of the frequency drift of the oscillator and reliable locking after the pentode T–1 ceases to conduct.

Figure 7:
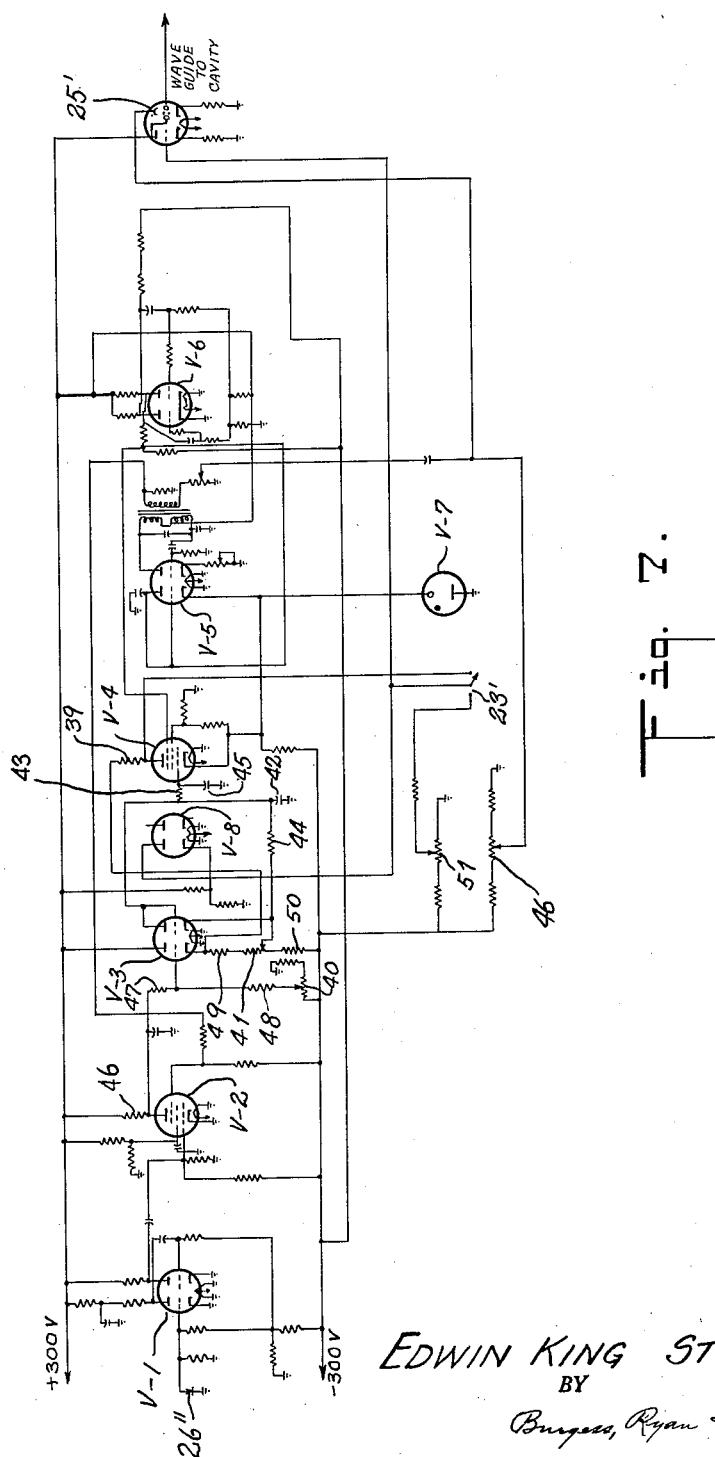
Fig. 7 is a schematic wiring diagram of certain portions of the system illustrated in Fig. 6.

In the systems that have been described, manual switching means have been employed for the starting of the search cycle of the system. Since this may be impractical for many types of operation, automatic means for starting the search cycle have been provided. A circuit for a system employing frequency modulation of the oscillator and an automatic search system is illustrated in Fig. 7. In the automatic searching system of Fig. 7, means are provided for periodically forcing the tuner grid away from the quiescent output voltage of the electronic system to the other limit of its operating range. Further, means are provided to disable the forcing means when the electronic system is energized by the system reaching its operating frequency.

In the circuit shown in Fig. 7, the output of the frequency reference cavity (not shown) is connected to a crystal 26'' and the output of the crystal which is positive with respect to ground is connected to one grid of a dual triode V–1 which functions as an audio amplifier. The corresponding plate of the tube V–1 is connected to a pentode V-2 which functions as a phase detector. The output of one half of a dual triode V–5 which functions as an audio oscillator is connected to the suppressor grid of the phase detector V-2. One half of the dual triode V-3 functions as a cathode follower at the cathode of which the output of the system illustrated in Fig. 6 appears. This output of the cathode follower half of V-3 is coupled through a high resistance 39 to the plate of a pentode search tube V-4.

The cathode of the search tube V-4 is held at a fixed voltage of minus 105 volts by a regulator tube V–7. In the absence of an incoming signal to the audio amplifier V–1, the cathode of the half of tube V–3 serving as a cathode follower is adjusted to about plus 15 volts by means of a variable resistor 40 which is connected to the cathode follower grid of tube V–3. A potentiometer 41 which is connected in the circuit to the cathode of the cathode follower half of the tube V-3 is then adjusted so that, with the cathode of the cathode follower at plus 15 volts, the grid of the search tube V–4 is at a voltage which will just allow the search tube V–4 to conduct heavily.

A multi-vibrator tube V–6 having a stable period of about ten seconds in each position is D. C. coupled to the suppressor grid of the search tube V–4. Thus, as the multivibrator V–6 operates, the plate circuit of the search tube V–4 is made alternately conducting and non-conducting and its plate voltage alternates between about minus 60 volts during conduction and plus 15 volts during non-conduction.

The other half of the dual triode V–5 which serves as an audio oscillator is connected to function as a diode and the output of this diode is connected to the suppressor grid of the search tube V–4 to limit the positive going excursion of the suppressor grid voltage of the tube V–4 so that precise adjustment of the D. C. coupling system from the multi-vibrator V–6 to the search tube V–4 is unnecessary. The output of the system just described appears at the plate of dual diode V–8 which is connected to the tuner grid of the "2K45" oscillator 25'. The dual diode V–8 limits the tuner grid voltage so that under no condition can this voltage exceed a voltage of about plus 15 volts.

In the absence of any incoming signal to the amplifying tube V–1, the voltage that is applied to the tuner grid of the oscillator swings back and forth between plus 15 and minus 60 volts. The limiting voltage of the minus voltage is not critical and any value more negative than minus 40 volts is adequate. However, when an input voltage of the proper phase is applied to the amplifying tube V–1, the voltage of the cathode of the cathode follower half of the tube V–3 goes to a high negative value and the voltage of the intermediate point on the potentiometer 41 at which the slider is set also goes negative with respect to its previous value. This negative impulse is transmitted to the control grid of the search tube V–4 from the plate of the other half of the tube V–3 which is connected to function as a diode by a network which includes a condenser 42 and a resistor 43. The condenser 42 and the resistor 43 in this network act as time delay elements. Because of the diode action of the tube V–3, the negative impulse is retained by the condenser 42 even after the negative impulse disappears due to the frequency of the oscillator drifting beyond the frequency range of the reference cavity. This operation, except for the delay, is similar to that of the lock-on memory device previously described, but its memory is extended for a considerably longer period. The search tube V–4 is thus cut off and the system can lock on frequency as previously described. However, if the lock-on does not occur, the potential of the grid search tube V–4 is gradually returned to an active level by conduction through a high resistance 44 which is a circuit connecting the control grid of the search tube V–4 to the cathode of the diode half of the tube V–3. When this occurs, the search for a lock-on point is resumed.

It should be noted that with this system, frequency lock-on can occur regardless of the direction in which the frequency of the oscillator is drifting. If the drift is occurring while the plate circuit of the search tube V–4 is non-conducting, the lock-on process is exactly as described for the manual methods considered heretofore. If the plate circuit of the search tube is conducting, the lock-on process occurs as follows: the tuner grid of the oscillator is held at about minus 45 volts. As the oscillator frequency drifts through the frequency range of the reference cavity, two conflicting effects act on the plate potential of the search tube V–4—(1) its plate supply voltage is reduced by the drop in the cathode voltage of the cathode of the cathode follower half of the tube V–3 which tends to reduce the plate potential, and (2) the same negative going cathode voltage is applied to the control grid of the search tube V–4 which tends to make its plate go positive. It is essential that the application of this second effect be delayed to allow sufficient time for the frequency of the oscillator to drift at least from the edge to the center of the frequency range of the reference cavity after which the effect of the cut-off of plate current must persist for a sufficient period to allow the direction of the frequency drift of the oscillator to reverse and lock-on to occur as in the case where the plate is non-conducting. The delay in the application of this effect is produced by the condenser 42, the resistor 43 and a condenser 45 which is connected to the control grid of the search tube V–4. As explained before, the persistence of this effect is produced by the diode half of the tube V–3 and the charging of the condenser 42.

The delay in application of the cut-off voltage to the plate of the search tube V–4 is extremely important in this arrangement as without it the frequency can lock at the edge of the frequency range of the reference cavity without cutting off the plate voltage of the search tube V–4 and the frequency will then be locked to the wrong value by two or three megacycles and will be periodically unlocked as the multi-vibrator operates.

With a feed-through type of cavity having a Q of about 3000 with about 10 db attenuation between it and a wave guide system containing, for example, a load of four crystals, locking on any desired frequency in the frequency range of the cavity is readily obtained with about a one or two megacycle swing on the frequency modulation produced by the A. C. component of the repeller voltage.

It should be mentioned that in this system, because of noise modulation, frequency locking of an uncertain kind may occur without systematic frequency modulation of the oscillator. Hence, to assure reliable locking, frequency modulation of the reflex oscillator by the modulating oscillator V–5 is essential. It is also essential that the phase of the frequency modulation with respect to the action of the phase detector diode V–3 be correct to assure that locking occurs at the center of the frequency response of the cavity rather than at the edge as will be the case if the phase is reversed. The correct arrangement is shown in Fig. 7 for a thermally tuned, reflex oscillator of the "2K45" type and for the number of audio stages and crystal polarity used. A potentiometer 46 is provided in the circuit connecting the repeller grid to the source of voltage and is set to apply a D. C. potential to the repeller grid of the correct value for operation of the oscillator at the reference frequency.

The system described operates satisfactorily with ordinary components used throughout. However, it is preferable to use temperature compensated, fixed resistors and very stable potentiometers in the portions of the system where D. C. coupling involves a rather critical set of voltages; i. e., for resistors 40, 41, 46, 47, 48, 49 and 50. In this system, a switch 23' connects the tuner control grid of the oscillator to a source of voltage through a potentiometer 51 for initiating operation of the system as previously described and to the output of the electronic system for automatic operation of the system thereafter.

In these systems violent shock does not cause unlocking of the control, but any frequency control system working only on the tuner grid of the oscillator cannot provide fast enough correction to overcome all of the microphonic effects that are produced in the tube by such shock. To reduce such microphonic effects, a D. C. system of the general type shown in Fig. 2, but working on both the tuner grid and the repeller of the oscillator may be used. The components for applying such a system to the system of Fig. 2 is illustrated in Fig. 8 in which parts corresponding to those shown in Fig. 2 have been identified by similar reference characters.

In the system of Fig. 8, the output of the D. C. amplifier 17 is connected to the repeller of the oscillator through a potentiometer 28 and a condenser 29 as well as being connected through the lock-on memory element to the tuner grid of the oscillator. It should be noted that in an oscillator of the "2K45" type, the phase of the variation to produce a given direction of frequency change is the same for both the repeller and the tuner grid of the oscillator.

The details of such a circuit which may be applied to the circuit shown in Fig. 3 are illustrated in Fig. 9. In this circuit, the cathode of the tube S-3 is connected to the repeller of the oscillator through the potentiometer 28 and the condenser 29 as indicated.

In this system when the potentiometer 28 is set so as to give no coupling to the repeller, the frequency spectrum of the oscillator can be observed on a spectrum analyser. As the oscillator is tapped lightly, the line on the spectrum analyser, indicating the center frequency, jumps over a range of about eight or ten megacycles before the disturbance subsides. As the potentiometer 28 is advanced to apply a repeller control voltage to the oscillator, the microphonic effect is greatly reduced and shifts of even one megacycle become quite infrequent. However, it should be noted that if too great a control voltage is applied to the repeller, the repeller voltage may be swung through such a wide range that the reflex oscillator ceases to function and the control may unlock. If desired, this possibility may be reduced by providing diode or other suitable voltage limiters to prevent the repeller voltage from being shifted outside the range of oscillations. However, it was found that in the system shown in Fig. 9 that with the slider of the potentiometer 28 advanced about one-third of the resistance from the control off end, and thus, limiting the gain of the repeller control system, substantial reduction of the microphonic effects was obtained with no unlocking difficulties. If desired, the control for the repeller may be taken through a separate channel to avoid any loading by the lock-on memory element and thereby allow more rapid control. However, it is more difficult to secure stable operation with such elements and the method illustrated in Fig. 9 is quite effective.

It will be understood that the automatic frequency control systems described herein might be applied with only slight modifications to a mechanically tuned, reflex oscillator by having a simple servo drive the tuning element of the oscillator and having appropriate limit stops at each end of the tuning range. In general, the expedients described for assuring reliable locking of frequency are generally applicable to automatic systems searching for a desired impulse where the search system has considerable inertia either of a mechanical or other nature. It will also be understood that various changes and modifications may be made in the particular embodiments of the invention as illustrated and described herein without departing from the scope of the invention as defined by the following claims.

I claim:

1. A frequency control system for automatically controlling the frequency of a microwave oscillator producing a continuous output wave, said microwave oscillator including a thermal control element adapted to respond to an applied voltage for thermally tuning the frequency of said microwave oscillator, comprising in combination, a feedback path including a fixed frequency cavity resonator coupled to the output of said microwave oscillator, said cavity resonator having a frequency response characteristic lying within a range of frequencies over which said microwave oscillator may be thermally tuned, crystal detector means coupled to said cavity resonator, direct-coupled amplifier means having an input circuit and an output circuit, said input circuit being coupled to said crystal detector means, an energy storage means, a unilateral conductive device directly coupled in series between the output circuit of said direct-coupled amplifier and said energy storage means, switching means coupled between the output of said energy storage means and the thermal control element of said microwave oscillator, and a source of fixed direct voltage coupled to said switching means, said switching means disconnecting said energy storage means from the thermal control element thereby opening said feedback path and coupling said source of fixed voltage to the thermal control element of said microwave oscillator during a first time interval for varying the frequency of said microwave oscillator to a first limit of its frequency range, said switching means disconnecting said source of fixed voltage from the thermal control element and coupling the output of said energy storage means to the thermal control element of said microwave oscillator at the end of said first time interval thereby closing said feedback path, the frequency of said microwave oscillator thereafter varying from said first limit towards the second limit of its frequency range, said cavity resonator responding to the output energy from said microwave oscillator when the frequency of said microwave oscillator falls within the frequency response characteristic of said cavity resonator for producing an output control signal, said unilateral conductive device and said energy storage means responding to the detected and amplified control signal from said direct-coupled amplifier and producing a direct output control voltage for controlling said thermal control element and arresting the change in the frequency of said microwave oscillator, said output control voltage maintaining the frequency of said microwave oscillator stabilized at a frequency near one edge of the frequency response characteristic of said cavity resonator.

2. The frequency control system as defined in claim 1 wherein said energy storage means is a condenser and said unilateral conductive device is a diode rectifier, and resistor means coupled in shunt with said diode rectifier.

3. The frequency control system as defined in claim 1 wherein said switching means is a single-pole, double-throw switch.

4. A frequency control system for automatically controlling the frequency of an oscillator, said oscillator including a control element adapted to respond to an applied voltage for controlling the frequency of the oscillator, comprising in combination, a feedback path including a resonant circuit coupled to the output of said oscillator, said resonant circuit having a frequency response characteristic lying within a range of frequencies over which said oscillator may be tuned, rectifier means coupled to said resonant circuit, direct-coupled amplifier means having an input circuit and an output circuit, said input circuit being coupled to said rectifier means, a condenser, a unilateral conductive device coupled in series with said condenser, said series coupled condenser and unilateral conductive device coupled across the output circuit of said direct-coupled amplifier, switching means coupled to the control element of said oscillator and to said condenser, and a source of fixed direct voltage coupled to said switching means, said switching means being adapted for opening said feedback path and coupling said source of fixed direct voltage to the control element of said oscillator during a first time interval, and being adapted for disconnecting said source of fixed direct voltage and coupling said condenser to the control element of said oscillator thereby closing said feedback path during a second time interval.

References Cited in the file of this patent

UNITED STATES PATENTS

| Number | Name | Date |
|---|---|---|
| 2,404,568 | Dow | July 23, 1946 |
| 2,434,294 | Ginzton | Jan. 13, 1948 |
| 2,452,575 | Kenny | Nov. 2, 1948 |
| 2,462,294 | Thompson | Feb. 22, 1949 |
| 2,468,029 | Bruck | Apr. 26, 1949 |
| 2,475,074 | Bradley et al. | July 5, 1949 |
| 2,541,066 | Jaynes | Feb. 13, 1951 |
| 2,570,758 | Braden | Oct. 9, 1951 |
| 2,611,092 | Smullin | Sept. 16, 1952 |

OTHER REFERENCES

Microwave Mixers, Radiation Lab. Series, vol. 16, 1948, Sections 7.10, 7.13, 7.14, 7.17, 7.18; published by McGraw-Hill Book Co.